(12) United States Patent
Hitomi (10) Patent No.: US 10,317,883 B2
(45) Date of Patent: Jun. 11, 2019

(54) NUMERICAL CONTROLLER FOR CLASSIFYING AND DISPLAYING MACHINING PROGRAM RECORDED AS HISTORY

(71) Applicant: FANUC Corporation, Minamitsuru-gun, Yamanashi (JP)

(72) Inventor: Ryuta Hitomi, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 239 days.

(21) Appl. No.: 15/097,312

(22) Filed: Apr. 13, 2016

(65) Prior Publication Data

US 2016/0306344 A1 Oct. 20, 2016

(30) Foreign Application Priority Data

Apr. 16, 2015 (JP) .................................. 2015-084059

(51) Int. Cl.
*G05B 19/4155* (2006.01)

(52) U.S. Cl.
CPC ............. *G05B 19/4155* (2013.01); *G05B 2219/31418* (2013.01)

(58) Field of Classification Search
CPC .............. G05B 19/4155; G05B 2219/31418
See application file for complete search history.

(56) References Cited

U.S. PATENT DOCUMENTS

| 5,315,503 A * | 5/1994 | Kato | G05B 19/40937 |
| | | | 700/180 |
| 5,793,635 A * | 8/1998 | Niwa | G05B 19/406 |
| | | | 318/570 |
| 6,006,141 A * | 12/1999 | Yoneda | G05B 19/4148 |
| | | | 700/169 |
| 6,466,241 B1 * | 10/2002 | Schindler | G06F 1/3215 |
| | | | 715/854 |

(Continued)

FOREIGN PATENT DOCUMENTS

| CN | 101025622 A | 8/2007 |
| CN | 101836183 A | 9/2010 |

(Continued)

OTHER PUBLICATIONS

Decision to Grant a Patent dated May 2, 2017 in Japanese Patent Application No. 2015-084059 (3 pages) with an English translation (3 pages).

(Continued)

*Primary Examiner* — Kenneth M Lo
*Assistant Examiner* — Chad G Erdman
(74) *Attorney, Agent, or Firm* — Drinker Biddle & Reath LLP (57) ABSTRACT

A numerical controller stores, among executed programs, a program applicable to a preset favorite condition in a specified storage area. The numerical controller then stores, based on execution history information on the program, the program applicable to the preset favorite condition in the storage area. The numerical controller then classifies the (Continued)

program stored in the storage area based on contents of the program, and displays the program stored in the storage area based on a result of classification.

6 Claims, 7 Drawing Sheets

(56) References Cited

U.S. PATENT DOCUMENTS

| | | | | |
|---|---|---|---|---|
| 6,999,841 | B1* | 2/2006 | Rutkowski | G05B 19/408 700/162 |
| 2001/0026137 | A1* | 10/2001 | Iwashita | H02M 7/53873 318/569 |
| 2004/0236462 | A1* | 11/2004 | Takeshita | G05B 19/4083 700/173 |
| 2007/0198125 | A1 | 8/2007 | Hosokawa et al. | |
| 2008/0086724 | A1 | 4/2008 | Ogata et al. | |
| 2010/0217762 | A1 | 8/2010 | Kajio et al. | |
| 2011/0190915 | A1* | 8/2011 | Fujishima | G05B 19/4067 700/97 |
| 2012/0179284 | A1* | 7/2012 | Nakamura | G05B 19/4068 700/160 |
| 2014/0053202 | A1* | 2/2014 | Selim | G06F 3/017 725/46 |
| 2014/0140213 | A1* | 5/2014 | Raleigh | H04L 67/2804 370/235 |
| 2015/0339134 | A1* | 11/2015 | Lin | G06F 9/445 713/2 |
| 2015/0378344 | A1* | 12/2015 | Yamashita | G05B 19/4155 700/186 |
| 2017/0285614 | A1* | 10/2017 | Kawai | G05B 19/409 |

FOREIGN PATENT DOCUMENTS

| | | |
|---|---|---|
| JP | H04-191934 A | 7/1992 |
| JP | H04-333102 A | 11/1992 |
| JP | H05-46227 A | 2/1993 |
| JP | H07-302107 A | 11/1995 |
| JP | H10-320025 A | 12/1998 |
| JP | 2000-66711 A | 3/2000 |
| JP | 2008-97103 A | 4/2008 |
| JP | 2013-041392 A | 2/2013 |

OTHER PUBLICATIONS

The Notification of the First Office Action dated May 9, 2018 in Chinese Patent Application No. 2016102392849 (7 pages) with an English translation (9 pages).

* cited by examiner

CLASSIFICATION TABLE 22

| CLASSIFICATION CONTENTS | CLASSIFICATION CODE |
|---|---|
| PREPARATORY FUNCTION | G CODE |
| SPINDLE FUNCTION | S CODE, M03,M04,M05 |
| FEED FUNCTION | F CODE |
| CORRECT TOOL LENGTH, DIAMETER | H CODE, D CODE |
| M CODE PECULIAR TO MACHINE | M CODE OTHER THAN M00, M01, M02, M30, M98, M99, M198 |
| POSITIONING COMMAND | G00, G01, G02, G03 |
| RETURN TO REFERENCE POSITION | G28, G30, G30.1 |
| MODAL CANCEL | G11, G13.1,G15, G23, G25, G40, G40.1, G49, G49.9, G50, G50.1, G50.2, G67, G69, G69.1, G80, G80.4, G80.5, G97, G113, G160 |
| SELECT COORDINATE SYSTEM | G52~G59, G54.4 |
| CALL CUSTOM MACRO, SUBPROGRAM | G65, M98 |
| REPLACE TOOL | M06 |
| COOLANT ON/OFF | M08, M09 |
| SPINDLE ORIENTATION | M19 |
| REPLACE PALETTE | M60 |

CONVENTIONAL DISPLAY EXAMPLE OF SCREEN FOR CALLING HISTORY PROGRAMS

FIG.7B

DISPLAY EXAMPLE OF SCREEN FOR CALLING HISTORY PROGRAMS IN PRESENT INVENTION

FIG.8

FIG.9

# NUMERICAL CONTROLLER FOR CLASSIFYING AND DISPLAYING MACHINING PROGRAM RECORDED AS HISTORY

RELATED APPLICATION DATA

This application claims priority under 35 U.S.C. § 119 and/or § 365 to Japanese Application No. 2015-084059 filed Apr. 16, 2015, the entire contents is incorporated herein by reference.

BACKGROUND OF THE INVENTION

1. Field of the Invention

The present invention relates to numerical controllers, and more particularly relates to a numerical controller capable of automatically classifying programs used at high frequency.

2. Description of the Related Art

To facilitate reuse of executed programs, there has been a function of recording a plurality of programs as history (see, for example, Japanese Patent Application Laid-Open No. 2013-041392). While such a function is utilized in general machining programs, the function is also often utilized in programs (hereinafter referred to as MDI programs), which are ad hoc for use in manual data input (MDI) operation executed for such minor actions as set-up of machine tools and tool replacement.

Figure 8:
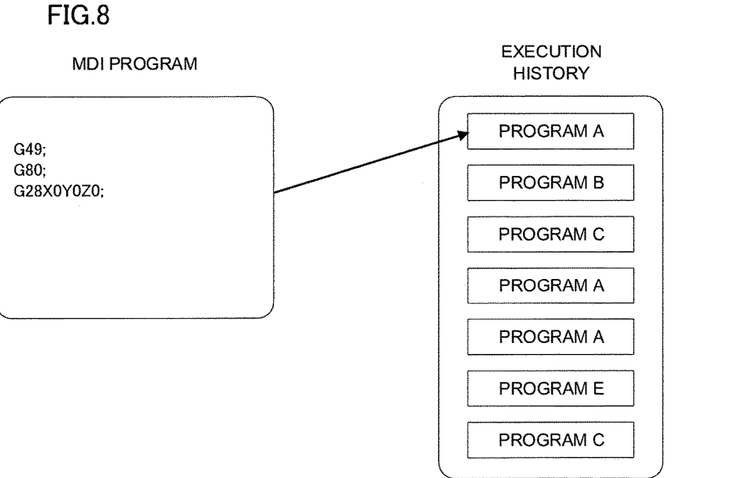
FIG. 8 is an explanatory view of execution history registration processing in the conventional technology.

FIG. 8 illustrates an example of recording MDI program execution history.

As illustrated in FIG. 8, most of the MDI programs are adapted to perform frequently utilized simple control (in the case of FIG. 8, correction or other actions is canceled, and returning to reference point is executed). In many cases, MDI programs, which are input to perform MDI operation for the same purpose, have similar contents. Accordingly, if frequently-used MDI programs are registered in a memory of the numerical controller or other storage and be reused later, enhanced working efficiency can be expected.

In the case where programs are recorded as history and reused by using the above-stated function, workloads of a user, who searches for a target program from among a plurality of recorded programs, for reuse of the target program disadvantageously increases as the number of the programs recorded as a history becomes larger.

Figure 9:
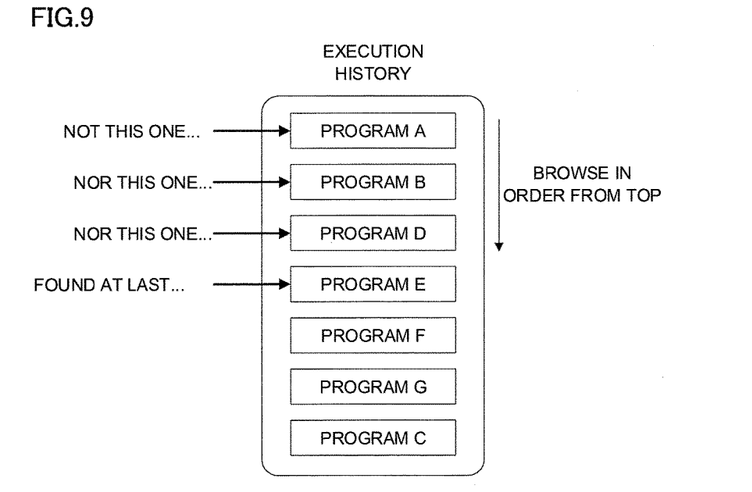
FIG. 9 is an explanatory view of a method for searching for a target program from an execution history.

FIG. 9 illustrates an example in which the user conducts a work of searching for a target program in the state where an execution history of a plurality of programs is recorded. The user needs to display a list of the programs recorded as an execution history and to browse the contents of the programs in order from the top of the list to search for the target program. In the case of the example illustrated in FIG. 9, a 4th program is the target program, and the user can find the target program by browsing four programs. However, when more programs are recorded as a history, the number of the programs to be browsed may become huge, which leads to a problem of adversely decreased working efficiency.

A technology of changing the storage location of a program in accordance with usage frequency from a viewpoint of utilization efficiency of the program is disclosed in Japanese Patent Application Laid-Open No. 04-191934 and other documents. However, even if such a technology should be applied to management of the machining program history, it cannot be said that the technology is sufficient enough to enhance user's program search efficiency when the volume of recorded program history increases.

SUMMARY OF THE INVENTION

Accordingly, an object of the present invention is to provide a numerical controller capable of reducing the time and effort for searching for a desired program from a program history.

The numerical controller according to the present invention controls a machine based on a program, the apparatus including: a program execution unit configured to execute control processing of the machine based on the program; an execution history storage area configured to store execution history information on the program executed by the program execution unit; an execution history recording unit configured to generate execution history information based on information relating to the program executed by the program execution unit and to record the execution history information in the execution history storage area; a favorite program storage area configured to store, among the programs, a program applicable to a preset favorite condition; a favorite program registration unit configured to register the program applicable to the favorite condition in the favorite program storage area, based on the execution history information stored in the execution history storage area; a favorite program classification unit configured to classify the program stored in the favorite program storage area based on contents of the program; and a favorite program display unit configured to display the program stored in the favorite program storage area based on a result of classification by the favorite program classification unit.

The favorite condition may be that number of executions of the program applicable to the favorite condition exceeds a predetermined specified number of times, and the favorite program registration unit may add up the number of executions of each of the programs based on the execution history information stored in the execution history storage area, and may register the program having the number of executions exceeding the preset specified number in the favorite program storage area.

The favorite condition may be that an executing frequency of the program applicable to the favorite condition exceeds a predetermined specified value in a predetermined latest period, and the favorite program registration unit may add up the executing frequency of each of the programs in the latest period based on the execution history information stored in the execution history storage area, and may register the program having the execution frequency exceeding the preset specified value in the favorite program storage area.

The numerical controller may further include a classification table configured to store classifications of the programs in association with codes used for the programs belonging to the classifications. The favorite program classification unit may classify the program stored in the favorite program storage area based on the classification table, based on the contents of the program.

According to the present invention, since a user can easily find a frequently-used program simply by referring to a list of the classifications corresponding to the program to be re-executed, it becomes possible to drastically reduce the time and effort for searching for a target program.

BRIEF DESCRIPTION OF THE DRAWINGS

These and other objects and features of the present invention will become apparent from the following description taken in conjunction with an embodiment with reference to the accompanying drawings, in which.

DETAILED DESCRIPTION OF THE PREFERRED EMBODIMENTS

Figure 1A:
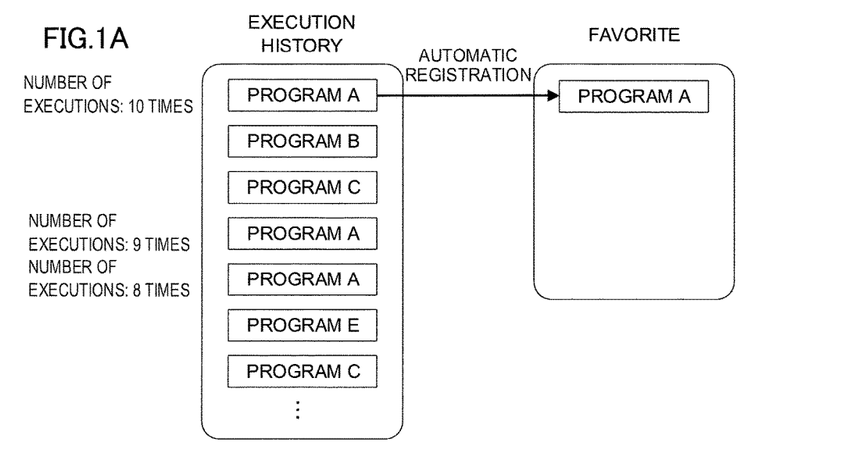
FIGS. 1A and 1B illustrate the outline of functions included in the numerical controller according to the present invention, the functions including an automatic registration function (FIG. 1A) to automatically register a program as "favorite" program and an automatic classification function (FIG. 1B) to automatically classify the program registered as "favorite" program in accordance with the contents thereof.
Figure 1B:
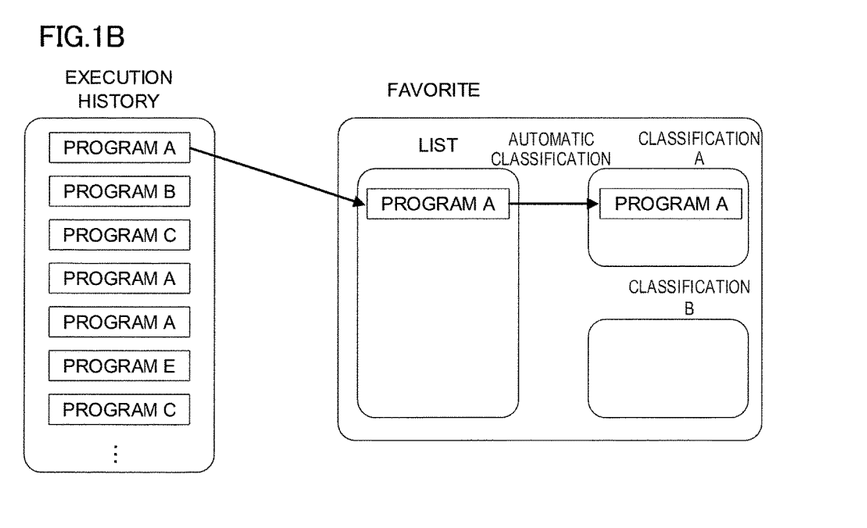

FIGS. 1A and 1B illustrate the outline of the functions included in the numerical controller according to the present invention.

The numerical controller includes an automatic registration function (FIG. 1A) to automatically register programs used at high frequency as "favorite" among the programs recorded as a history, and an automatic classification function (FIG. 1B) to automatically classify the programs registered as "favorite" in accordance with the contents thereof. When a user refers to the program history, he/she can browse only the programs with high use frequency by viewing the "favorite" list. Accordingly, the accuracy of finding a target program can be enhanced to some extent, and selecting a classification item enables the search to be further narrowed down corresponding to purposes, so that the time and effort for searching for a desired program from the history can drastically be reduced.

The numerical controller according to the present invention includes the function of recording a plurality of programs as a history in order to facilitate reuse of the programs executed in the past. In the following description, the programs to be reused are assumed to be MDI programs.

Figure 2:
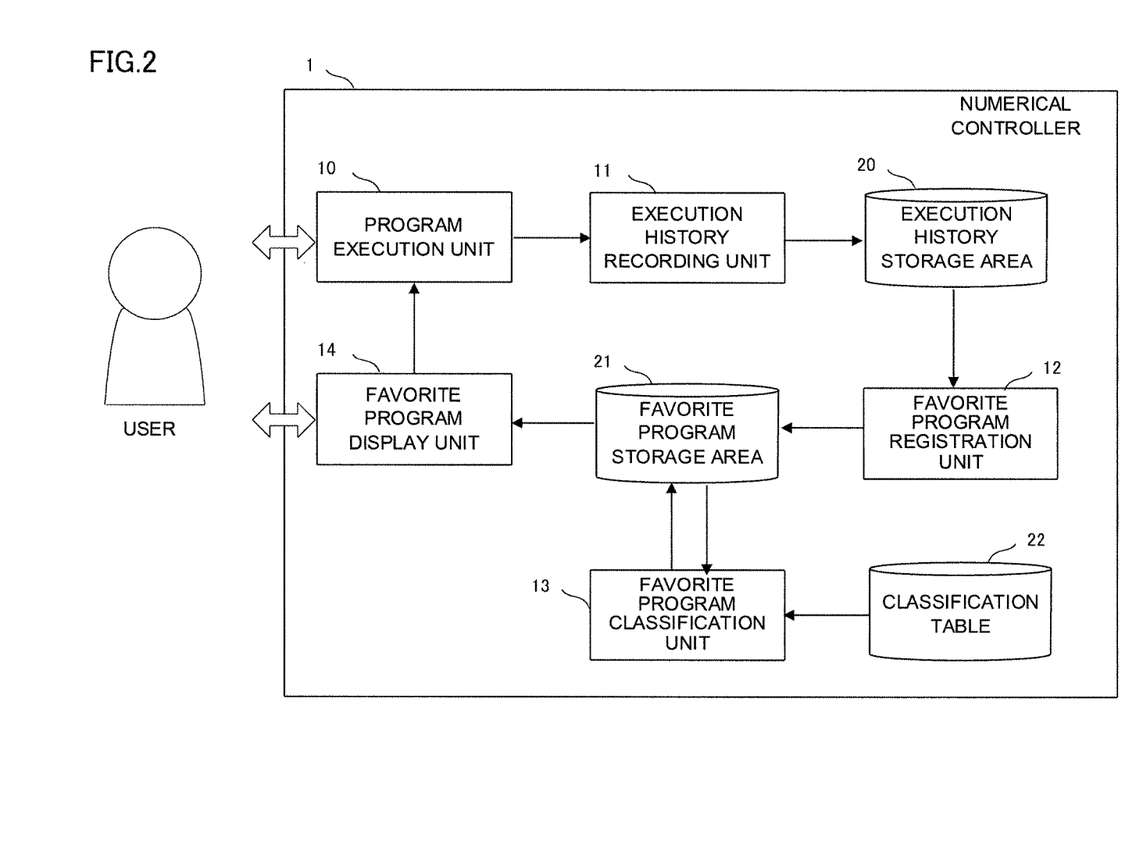
FIG. 2 is a functional block diagram of the numerical controller according to one embodiment of the present invention.

FIG. 2 is a functional block diagram of the numerical controller according to one embodiment of the present invention.

A numerical controller 1 includes a program execution unit 10, an execution history recording unit 11, a favorite program registration unit 12, a favorite program classification unit 13, a favorite program display unit 14, an execution history storage area 20, a favorite program storage area 21, and a classification table 22.

The program execution unit 10 executes a MDI program input by a user through an indicator/MDI unit (not illustrated), or an MDI program selected by the user with a later-described favorite program display unit 14. As a result, control processing of a machine as a control target is executed based on the MDI program.

When information relating to an executed MDI program is acquired from the program execution unit 10, the execution history recording unit 11 creates execution history information based on the acquired information relating to the MDI program, and records the information in the execution history storage area 20.

Figure 3:
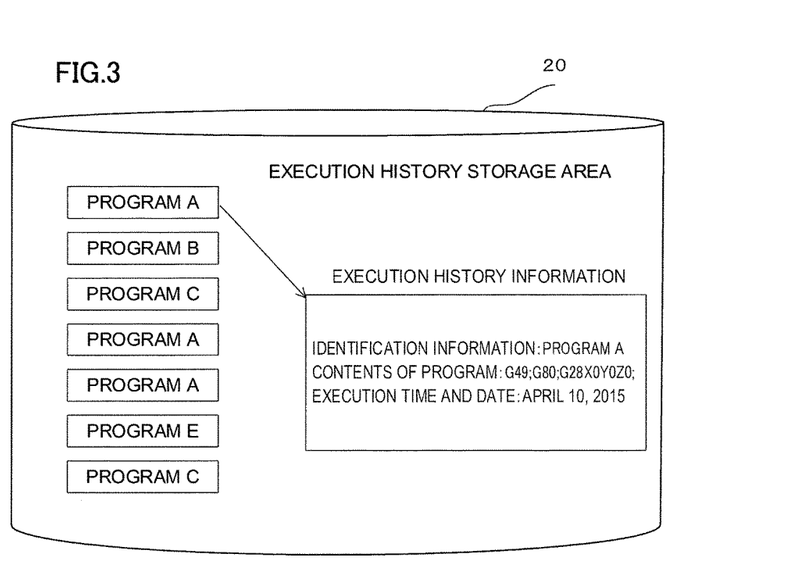
FIG. 3 illustrates an example of execution history information stored in an execution history storage area included in the numerical controller of FIG. 2.

FIG. 3 illustrates an example of the execution history information stored in the execution history storage area 20.

The execution history storage area 20 stores a plurality of pieces of execution history information. The execution history information includes at least identification information on the MDI program, and a MDI program body. The execution history information may further include, as information for managing the execution history information, information such as date and time when the MDI program was executed. In the execution history storage area 20, the execution history information including the same MDI program can redundantly be registered. The identification information on the MDI program is provided to uniquely identify the MDI program included in the execution history information stored in the execution history storage area 20. The same identification information is imparted to the same MDI programs.

When the program execution unit 10 detects execution of the MDI program input by the user, the execution history recording unit 11 acquires the executed MDI program from the program execution unit 10, and checks whether or not the execution history information, which includes the MDI program same as the body of the acquired MDI program, is already stored in the execution history storage area 20. When the execution history information including the same MDI program is present, the execution history recording unit 11 acquires the identification information on the MDI program from the execution history information, creates new execution history information which includes the acquired identification information, the MDI program body, and other management information, and records the new information in the execution history storage area 20. When the execution history information including the same MDI program is not present, the execution history recording unit 11 creates new identification information on the MDI program, creates new execution history information which includes the created identification information, the MDI program body, and other management information, and records the created execution history information in the execution history storage area 20.

When the program execution unit 10 detects execution of the MDI program selected by the user through the favorite program display unit 14, the execution history recording unit 11 acquires the identification information on the executed MDI program from the program execution unit 10, creates new execution history information which includes the acquired identification information, the MDI program body, and other management information, and records the created execution history information in the execution history storage area 20.

The favorite program registration unit 12 refers to the execution history storage area 20, adds up the number of executions of each MDI program based on the identification information on the MDI programs included in the execution history information, and executes automatic registration processing that registers, in the favorite program storage area 21, the MDI program having the number of executions exceeding a preset specified number as "favorite" MDI program information. The automatic registration processing may be executed for the entire execution history information stored in the execution history storage area 20 at specified timing (at the startup of the numerical controller, every hour, or the like). Or the automatic registration processing may also be executed for the execution history information registered when the execution history recording unit 11 records the execution history information.

Figure 4:
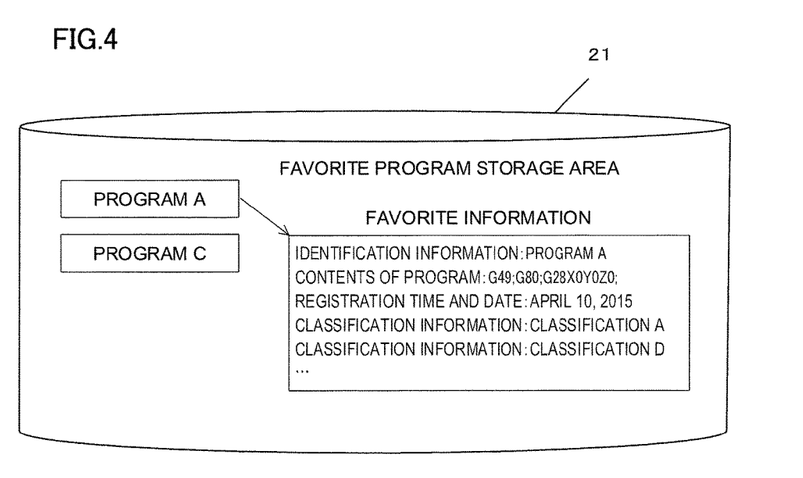
FIG. 4 illustrates an example of favorite information stored in a favorite program storage area included in the numerical controller of FIG. 2.

FIG. 4 illustrates an example of the favorite information stored in the favorite program storage area 21.

A plurality of pieces of favorite information are stored in the favorite program storage area 21. The favorite information includes at least MDI program identification information, an MDI program body, and classification information. The favorite information may further include information, such as date and time when the favorite information is registered, as the information for managing the favorite information. The classification information is imparted to the favorite information by the favorite program classification unit 13 through automatic classification processing. Two or more pieces of classification information may be imparted to one piece of favorite information.

Figure 5:
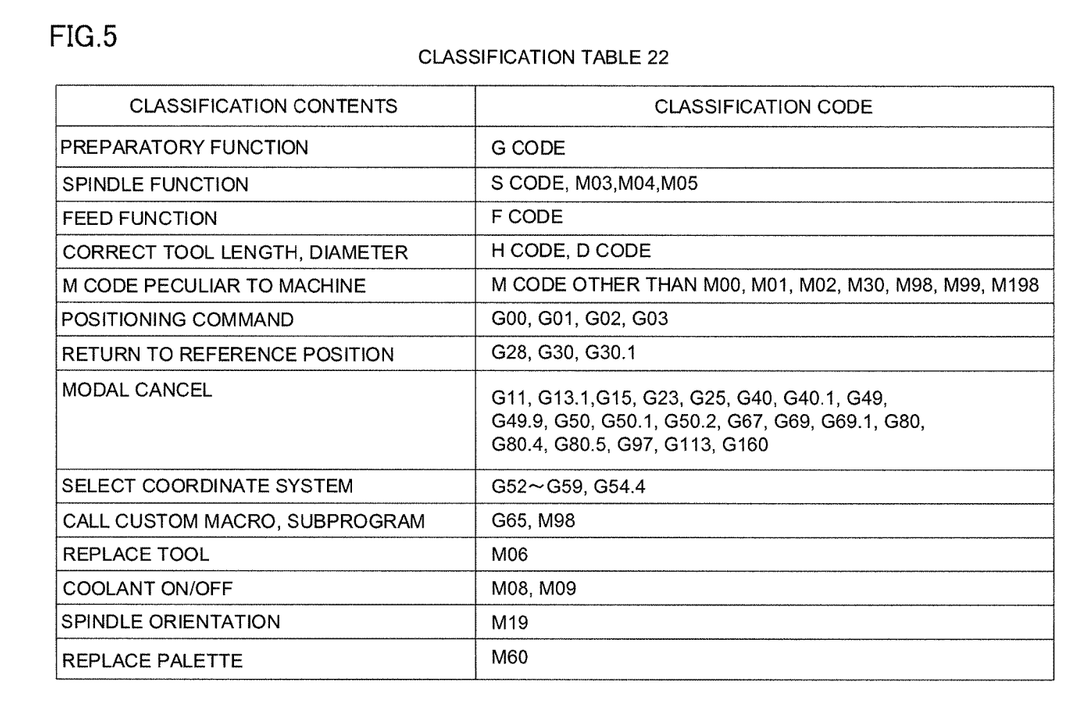
FIG. 5 illustrates an example of a classification table included in the numerical controller of FIG. 2.

The favorite program classification unit 13 executes automatic classification processing to determine a classification to be imparted to an MDI program based on the contents of the MDI program body included in the favorite information registered in the favorite program storage area 21 and on the classification table 22 and to impart to the favorite information the determined classification as classification information.

FIG. 5 illustrates one example of the classification table.

The classification table 22 is a table for determining, based on a code used for an MDI program, classifications of the MDI program which uses the code. For example, the classification table 22 is constituted as a table in which classification contents are associated with classification codes as illustrated in FIG. 5. The favorite program classification unit 13 extracts a classification corresponding to the classification code included in an MDI program body included in the favorite information with reference to the classification table 22, and imparts the extracted classification to the favorite information as classification information.

Figure 6:
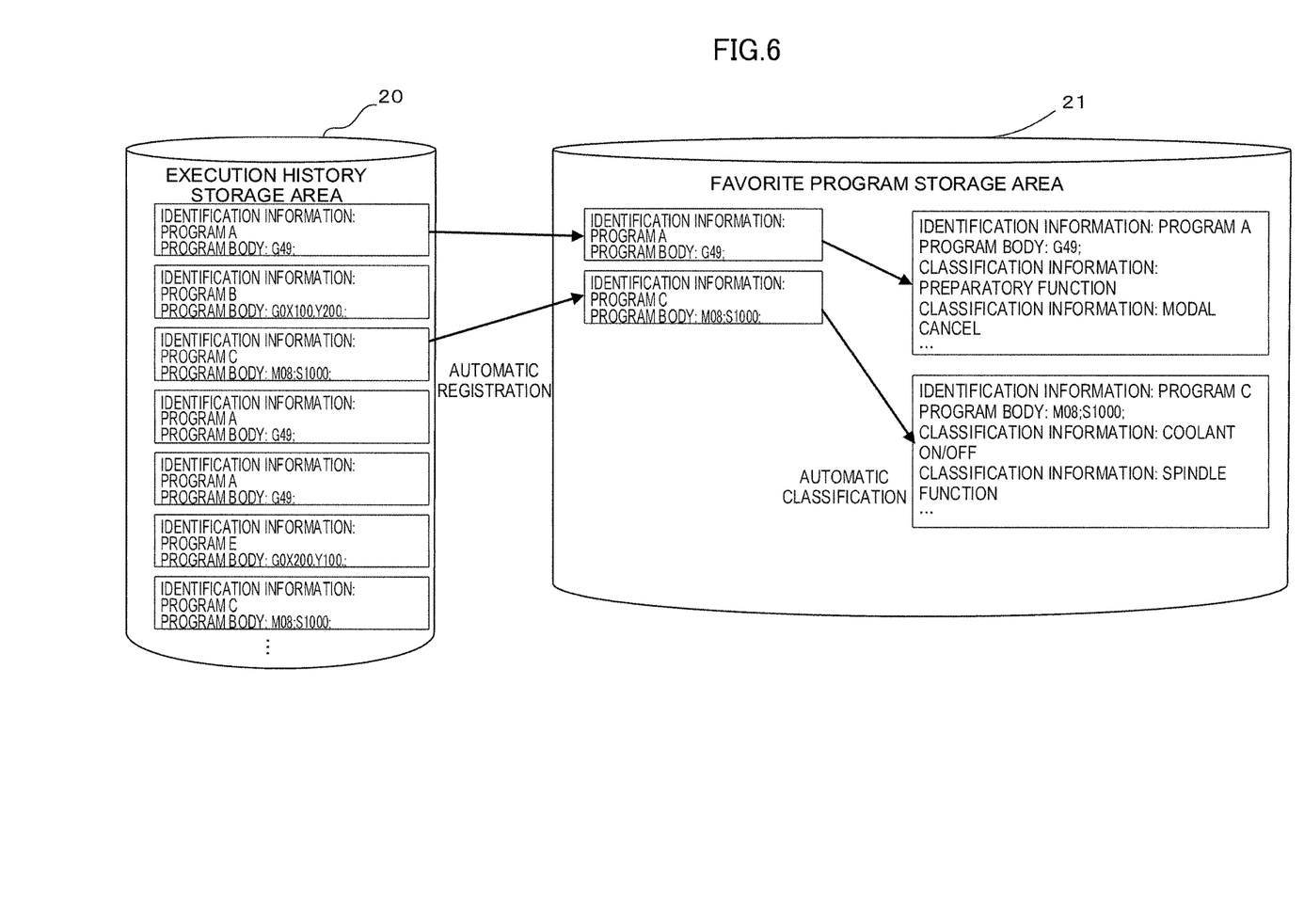
FIG. 6 illustrates specific examples of favorite program automatic registration processing executed by a favorite program registration unit included in the numerical controller of FIG. 2 and automatic classification processing executed by a favorite program classification unit included in the numerical controller of FIG. 2.

FIG. 6 illustrates specific examples of favorite program automatic registration processing executed by the favorite program registration unit 12 and automatic classification processing executed by the favorite program classification unit 13.

In FIG. 6, it is assumed that programs A having a program body of "G49;" and programs C having a program body of "M08;S1000;" are each stored in the execution history storage area 20 and that the number of the programs A and the programs C are equal to or more than a specified number, respectively. In this case, the favorite program registration unit 12 extracts information on these programs A and programs C from the execution history storage area 20, generates favorite information on each of these programs, and automatically registers the generated favorite information in the favorite program storage area 21. The favorite program classification unit 13 then determines that the program body "G49;" of the programs A belongs to 'classification: preparatory function' and 'classification: modal cancel' with reference to the classification table 22, and imparts these classifications as classification information. The favorite program classification unit 13 also determines that the program body "M08;S1000;" of the programs C belongs to 'classification: coolant ON/OFF' and 'classification: spindle function' with reference to the classification table 22, and imparts these classifications as classification information.

The favorite program display unit 14 acquires the favorite information stored in the favorite program storage area 21 based on a command from the user, and displays the information on the indicator/MDI unit (not illustrated) of the numerical controller 1. The favorite program display unit 14 also outputs an MDI program, among the displayed MDI programs, whose execution is commanded by the user, to the program execution unit 10. When displaying the favorite information stored in the favorite program storage area 21, the favorite program display unit 14 displays information relating to the MDI program per classification selected by the user.

Figure 7A:
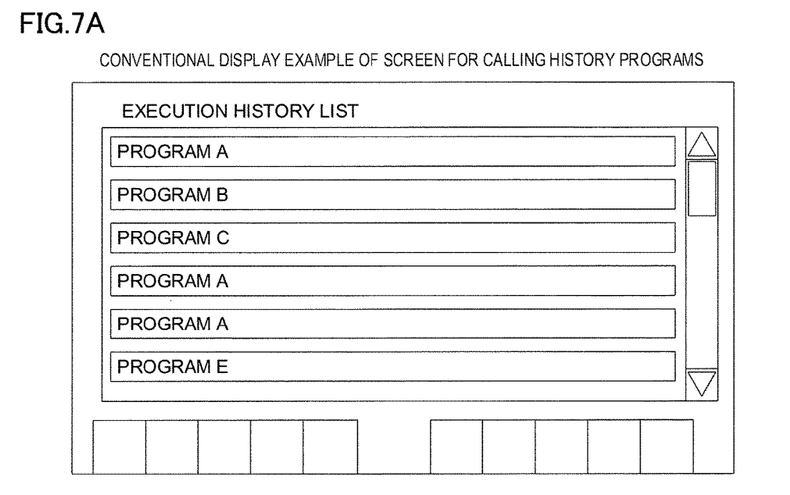
FIGS. 7A and 7B are a display example (FIG. 7A) of a conventional execution history display screen and a display example (FIG. 7B) of a favorite display screen displayed by a favorite program display unit 14 according to the present invention.
Figure 7B:
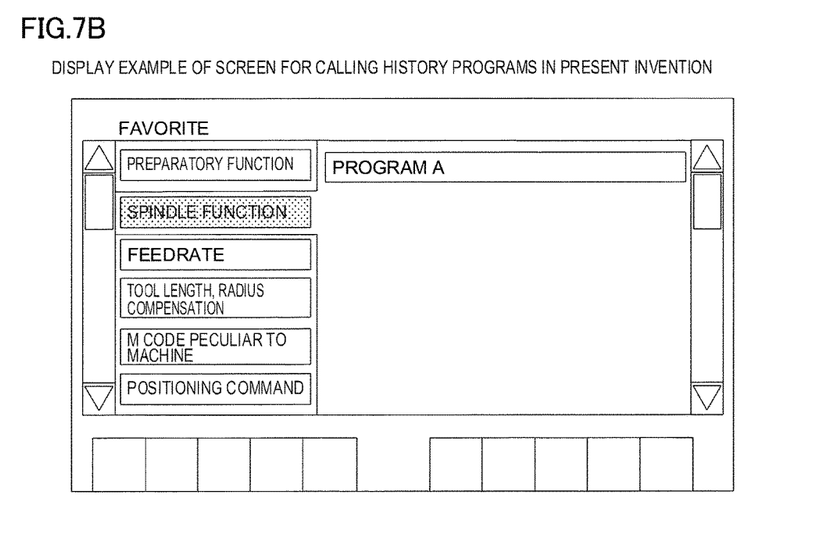

FIGS. 7A and 7B are a display example (FIG. 7A) of a conventional execution history display screen and a display example (FIG. 7B) of a favorite display screen displayed by the favorite program display unit 14 according to the present embodiment.

In the past, the MDI programs recorded as an execution history were simply displayed as a list as illustrated in FIG. 7A, and therefore the user needed time and effort to search for a desired program. In the favorite display screen displayed by the favorite program display unit 14 of the present embodiment, the MDI programs displayed on the screen are limited to those used by the user at high frequency as illustrated in FIG. 7B. Furthermore, when the user selects one of the classifications displayed on the left side of the screen, only the MDI programs to which the selected classification is imparted is displayed as a list on the right side of the screen. This achieves drastic reduction in the time and effort of the user who searches for a desired program.

Although the embodiment of the present invention has been described in the foregoing, the present invention can be implemented in various modes by adding appropriate modifications without being limited to the example of the above-stated embodiment.

For example, although an example of applying the present invention to the execution history of the MDI programs has been described in the above-stated embodiment, the present invention is also applicable to an execution history of normal machining programs. In that case, program names may be used as identification information on the machining programs. Although it is difficult to classify the machining programs based on simple codes as compared with the MDI programs, the difficulty can be overcome by constituting the controller to allow more detailed classification by using regular expressions and/or logical expressions matched with character strings and/or a series of continuous block expressions input in a comment as classification codes which are associated with classifications in the classification table.

Although the respective function units described in the above-stated embodiment have been described as function units different from each other, these function units may appropriately be integrated or be divided. For example, the functions necessary for the present invention are not compromised even when the program execution unit 10 and the execution history recording unit 11, the favorite program registration unit 12 and the favorite program classification unit 13, and other combinations are integrated as one function unit, respectively.

The data structure of the execution history information recorded in the execution history storage area 20 and the favorite information stored in the favorite program storage area 21 is variable in design. For example, the execution history storage area 20 may be configured to include an area separately provided for storing the identification information on the programs in association with the program bodies, so that the program bodies are excluded from the execution history information itself, and the separately-provided area is referred to based on the identification information on the programs. In this way, the execution history information can efficiently be stored. Furthermore, the number and/or period of the execution history information to be stored in the execution history storage area 20 may be limited.

In the example of the above-stated embodiment, the condition of registering the programs as favorite in the favorite program storage area is based on the number of executions. However, the condition of registering in the favorite program storage area is not limited thereto. For example, the program to be registered as favorite may be determined based on an execution frequency in a specified period (for example, based on the number of executions in latest one week, and the like) instead of the simple number of execution.

The classification method is also not limited to the form of imparting classification information as in the above-stated embodiment. Classification may be implemented by such a technique as providing an area of storing classification information and storing the identification information on each program in the area.

In the example of the above embodiment, the favorite program classification unit 13 classifies the programs using the classification table 22. However, the method for classifying the program is not limited thereto, but other various text analysis techniques may also be adopted.

Furthermore, various display techniques may be adopted for displaying the favorite display screen with the favorite program display unit 14, such as a technique of enabling the conventional execution history display screen and the favorite display screen to be switched and displayed, without hindering the effect of the present invention.

The invention claimed is:

1. A numerical controller for controlling a machine based on a program, the numerical controller including a processor and a memory having instructions stored therein which, when executed by the processor, cause the processor to perform a method comprising:
   executing control processing of a machine based on a program;
   generating execution history information based on information relating to the executed program;
   recording the generated execution history information of the executed program in an execution history storage area;
   registering, in a favorite program storage area, the executed program based on a preset favorite condition and the generated execution history information of the executed program recorded in the execution history storage area, wherein the registered program is one of a plurality of registered programs in the favorite program storage area, the preset favorite condition includes an executing frequency of the executed program, and wherein the executed program is registered in the favorite program storage area when the executing frequency of the executed program exceeds a predetermined specified value in a predetermined latest period;
   classifying the registered program in the favorite program storage area based on contents of the registered program, wherein the classification of the registered program is one of a plurality of classifications corresponding to different actions associated with controlling the machine; and
   controlling a display to switch between displaying (i) an unfiltered listing of the plurality of registered programs and (ii) a subset of the plurality of registered programs, the subset of registered programs corresponding to a selected classification of the plurality of classifications.

2. The numerical controller according to claim 1, wherein the preset favorite condition further includes a number of executions of the executed program and the executed program is registered in the favorite program storage area when the number of executions of the executed program exceeds a predetermined specified number of times, and
wherein the method further comprises:
   adding up, for each program executing control processing of the machine, a number of executions of the executed program based on respective generated execution history information recorded in the execution history storage area, and
   registering, in the favorite program storage area, each program having a respective number of executions exceeding the predetermined specified number of times.

3. The numerical controller according to claim 1, wherein the method further comprises:
   calculating, for each program executing control processing of the machine, an executing frequency of the executed program in the predetermined latest period based on respective generated execution history information recorded in the execution history storage area, and
   registering, in the favorite program storage area, each program having a respective execution frequency exceeding the predetermined specified value in the predetermined latest period.

4. The numerical controller according to claim 1, further comprising:
   storing the classification of the registered program in association with one or more codes of a classification table used for programs belonging to the classification,
   wherein classifying the registered program in the favorite program storage area is based on the classification table and contents of the registered program.

5. The numerical controller according to claim 2, further comprising:
   storing the classification of the registered program in association with one or more codes of a classification table used for programs belonging to the classification,
   wherein classifying the registered program in the favorite program storage area is based on the classification table and contents of the registered program.

6. The numerical controller according to claim 3, further comprising:
   storing the classification of the registered program in association with one or more codes of a classification table used for programs belonging to the classification,
   wherein classifying the registered program in the favorite program storage area is based on the classification table and contents of the registered program.

* * * * *